Oct. 24, 1933.   E. A. HEDENSTROM   1,931,696
WELDING AND CUTTING MACHINE
Filed July 8, 1932    3 Sheets-Sheet 1
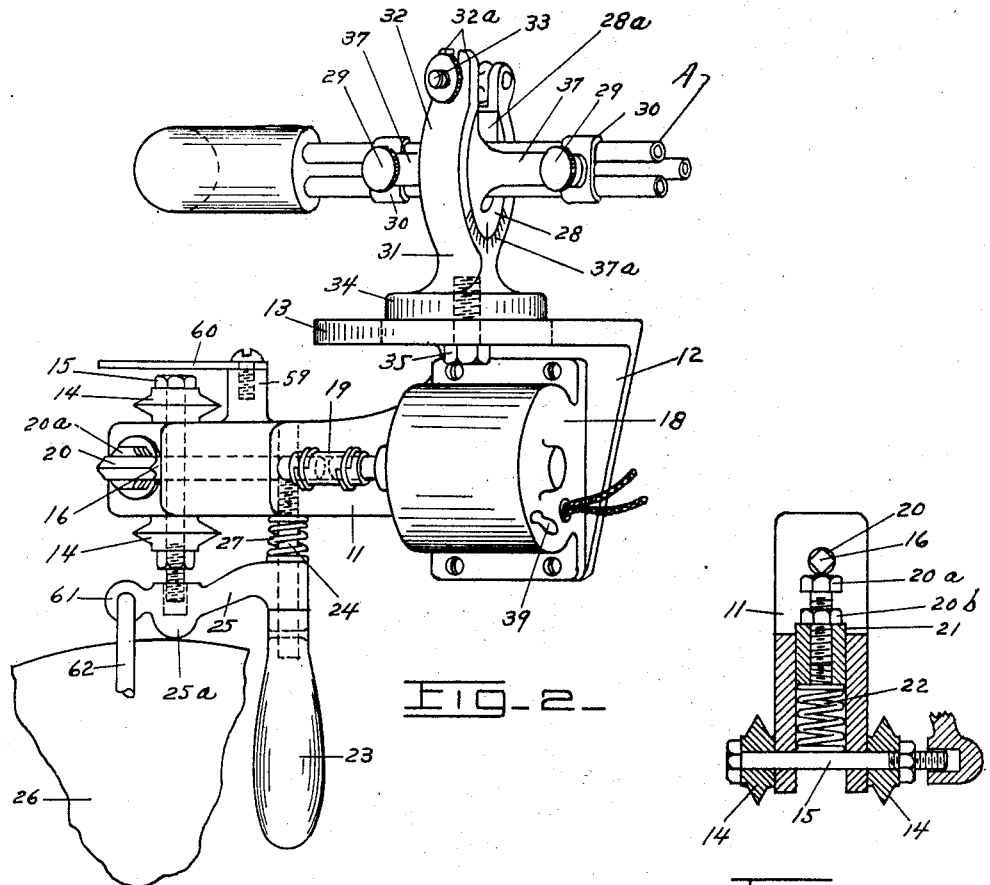
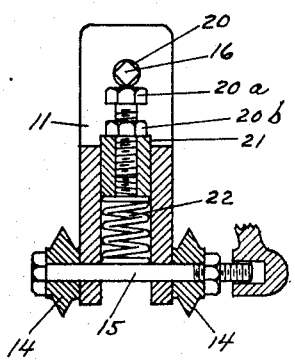
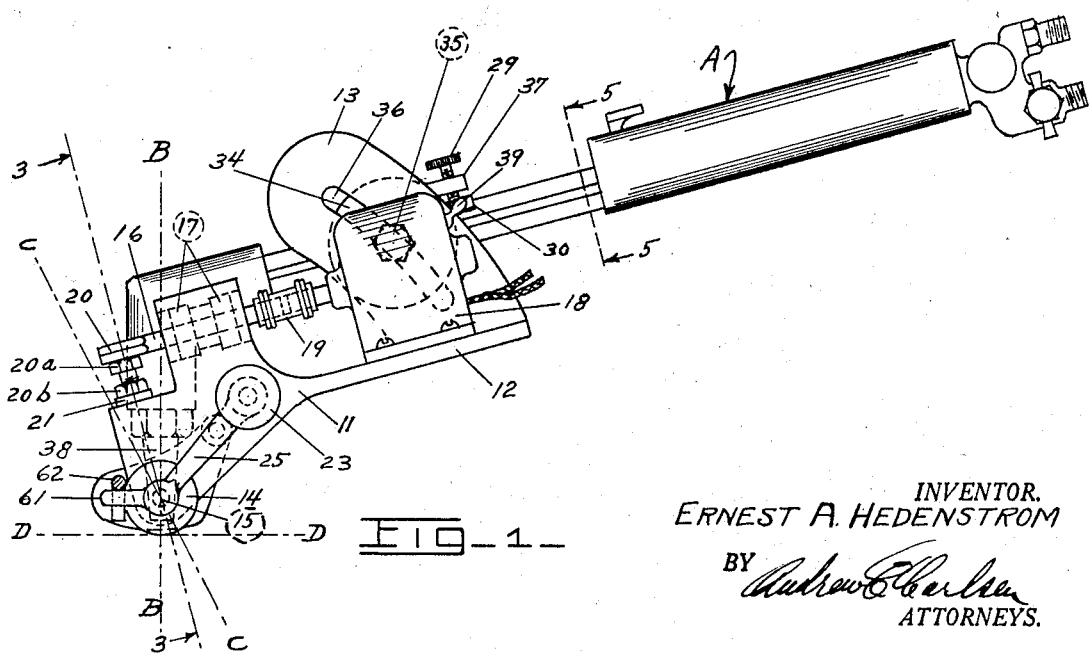
INVENTOR.
ERNEST A. HEDENSTROM
BY
ATTORNEYS.

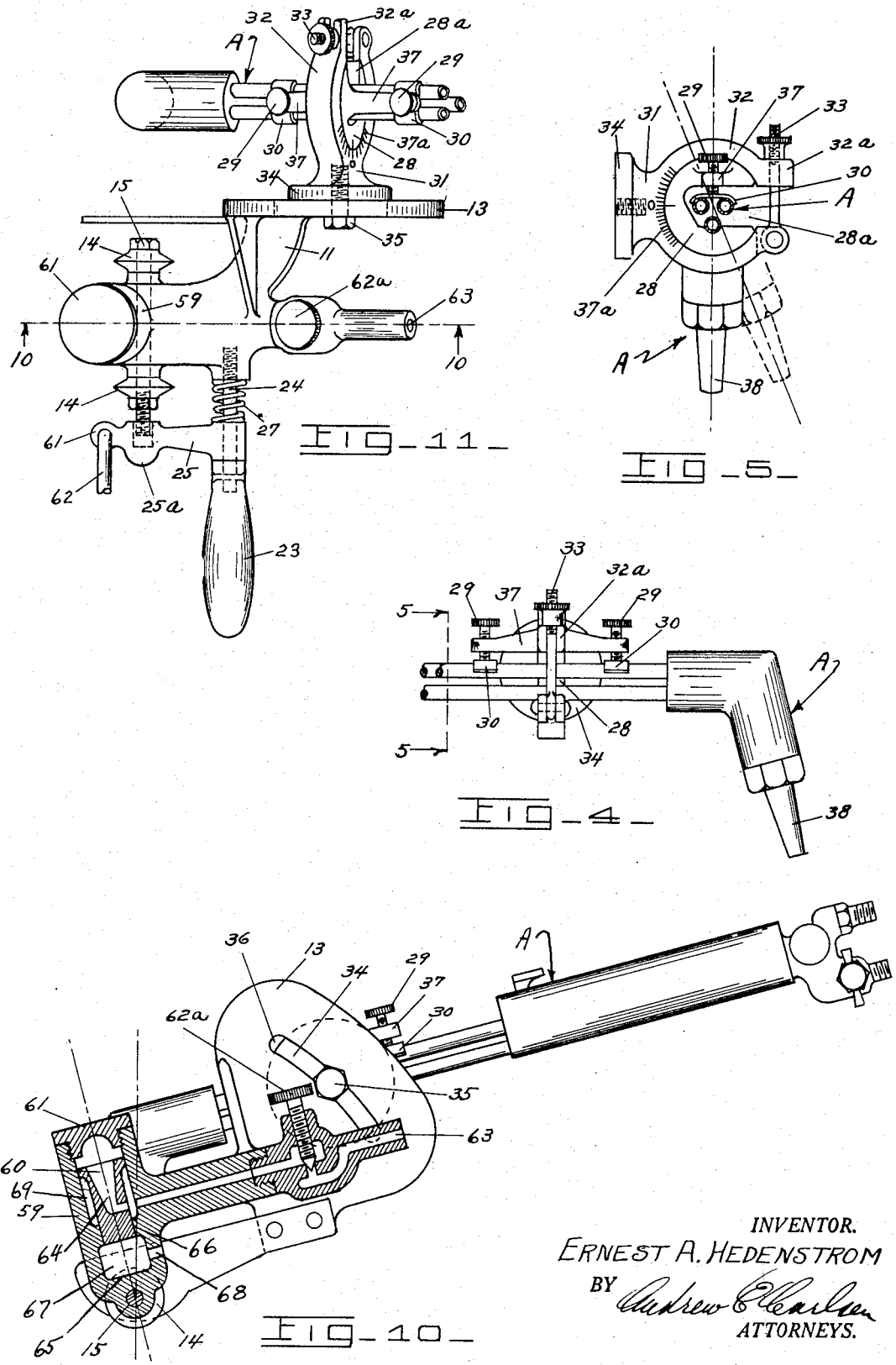

Oct. 24, 1933.  E. A. HEDENSTROM  1,931,696
WELDING AND CUTTING MACHINE
Filed July 8, 1932    3 Sheets-Sheet 3
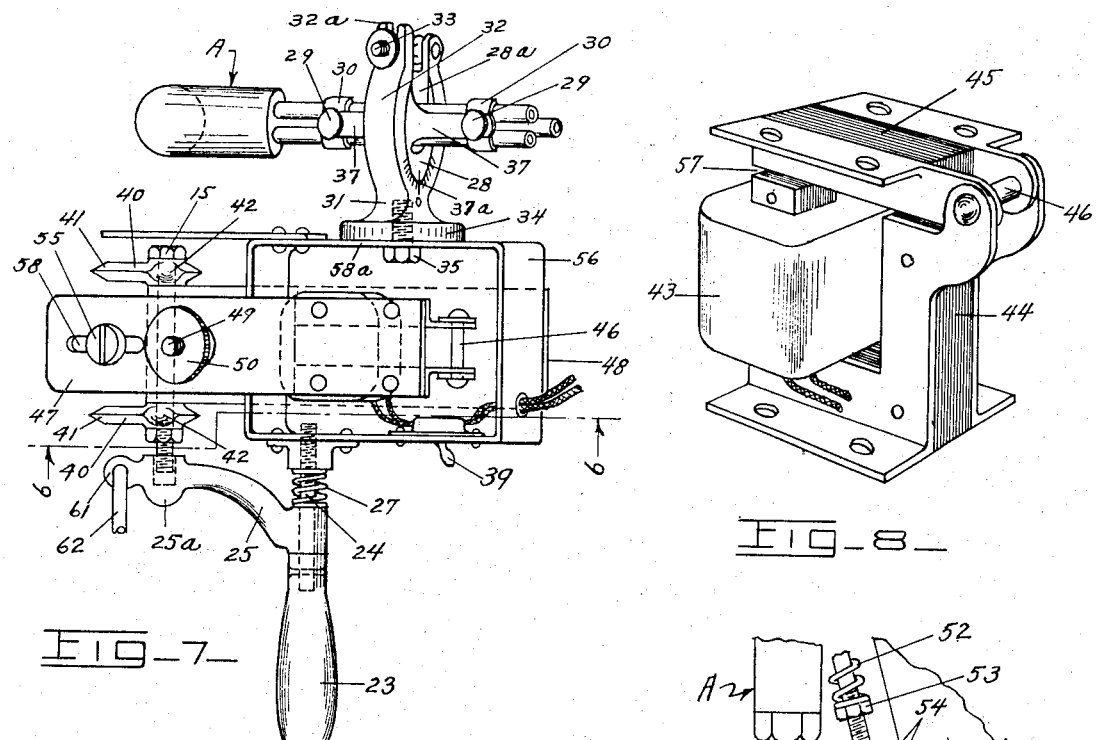
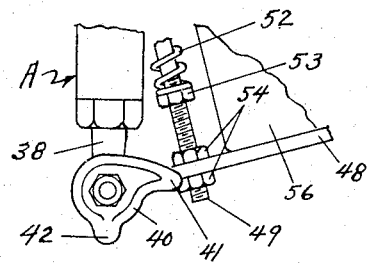
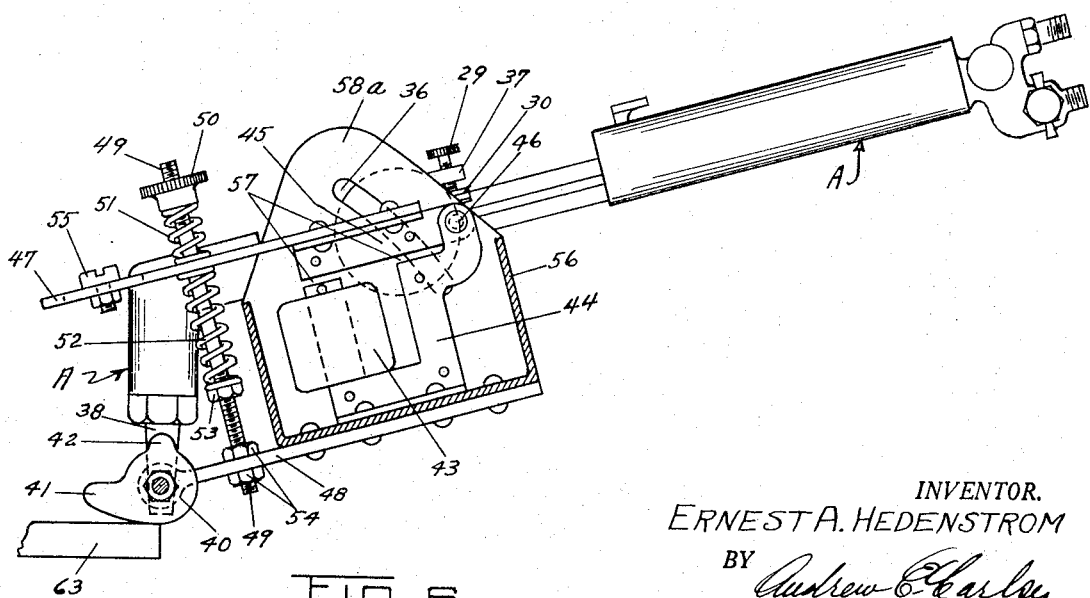
INVENTOR.
ERNEST A. HEDENSTROM
BY
ATTORNEYS.

Patented Oct. 24, 1933

1,931,696

UNITED STATES PATENT OFFICE 1,931,696

WELDING AND CUTTING MACHINE

Ernest A. Hedenstrom, Minneapolis, Minn.

Application July 8, 1932. Serial No. 621,420

23 Claims. (Cl. 266—23)

This invention relates to mounting and feed control devices for welding and cutting instruments. The cutting or welding of materials with torches, or other instruments held in the hands, is commonly called hand cutting or welding and is highly desirable in practice, due to the flexibility of action obtainable by manually operating and controlling a relatively light portable instrument. It is, however, practically impossible to obtain smooth and uniform welds or cuts with such hand operated devices under ordinary working conditions and with implements as now employed. It is not only extremely fatiguing to the operator to use the hand method on extensive operations, due to the intensive concentration and attention required of the operator, but is also found to be objectionable because of the inefficiency and inaccuracy incident to such methods. Hand operated instruments require in practice very competent and well trained operators under the most favorable circumstances, and consequently give rise to most serious problems to shops, factories, and other establishments where such operators are employed.

It will thus be readily understood that in the fabrication of metals it is possible to effect large economies if the metals can be cut or welded smoothly, efficiently, to the exact required size, and with a minimum amount of expense and equipment, thus eliminating insofar as possible finishing operations such as planing, turning, filing, etc.

Power driven machines for cutting and welding are of course available but are so costly as to be virtually prohibitive to the average manufacturer or shop. Furthermore, their flexibility of application is limited, and even those classed as being portable are heavy to pick up and move about. Great caution is also required in their usage due to the high purchase price involved and excessive expense required for maintenance and repairs. Also, the available power driven machines usually require the use of special cutting or welding instruments, and tracks for guiding the machines are also often necessary, thus requiring an extra set up operation and resulting in additional time and expense.

It may also be noted that available power driven machines for cutting and welding are almost exclusively confined to operating on flat horizontal surfaces, unless especially designed to operate on such other surfaces and to which their operations are then distinctly limited.

The main object of my invention is to provide a light, portable, inexpensive and practical mounting and feed control device to which welding or cutting instruments may readily be attached. My device is comparatively cheap to manufacture and can be sold at a reasonable price, which makes it possible for practically all owners of welding and cutting instruments to expand and enlarge their field of operation. An important feature of my device is that it is not confined to any single instrument, such as a cutting blow pipe of one certain form. On the other hand all existing cutting blow pipes that are being used in hand operation may be attached to my device, thereby eliminating an unnecessary expenditure due to its universal application of use. Any blow pipe thus attached to my device can furthermore be quickly detached, thereby rendering the detached blow pipe available for any other desirable service independently of the device when so desired.

Another important feature of my device is that it is not confined to operating on flat horizontal material, but can be used on material lying in any plane from a horizontal to a vertical position, and can operate on curved or irregular surfaces such as on pipes or tanks. It can also be easily transported to remote places and operated as readily as in a shop. The device, having comparatively few moving parts, is extremely simple and durable and requires no complicated transmission or reduction gearing.

The device is particularly valuable to small plants and shops as inexperienced operators will, with a minimum amount of practice, be able to secure uniformly satisfactory and efficient results, making it possible for such plants to accept and complete jobs in this art which they might otherwise not have attempted.

Further and more specific objects will be disclosed in the course of the following specifications, reference being had to the accompanying drawings, wherein:

Fig. 1 is a side elevation of a preferred form of my device, in this instance actuated by an electric motor, and showing a blow pipe attached in operative position.

Fig. 2 is a slightly enlarged top or plan view of the device as seen in Fig. 1, but with the blow pipe handle broken away.

Fig. 3 is a detail section on line 3—3 in Fig. 1.

Fig. 4 is a detail side view of the blow pipe securing clamp and adjusting device.

Fig. 5 is another detail view of the blow pipe securing clamp and adjusting device, on a section taken through the blow pipe tubes on the line 5—5, in either of Figs. 1 or 4.

Fig. 6 is a sectional elevation on the line 6—6 in Fig. 7 showing a modified embodiment of the invention, in this instance the pulsator being an electrically actuated magnetic vibrator.

Fig. 7 is a top or plan view of the device as seen in Fig. 6, the blow pipe handle being broken away.

Fig. 8 is an enlarged detail perspective view, showing the construction of the magnetic vibrator unit employed in the structures illustrated in Figs. 6 and 7.

Fig. 9 is a detail side view showing an adjustable shoe as incorporated in Figs. 6 and 7.

Fig. 10 is a sectional elevation of a further modification of the invention, in this instance the vibrator or pulsator being fluid pressure actuated. This view is taken substantially on the line 10—10 in Fig. 11.

Fig. 11 is a top or plan view of the device as seen in Fig. 10, the blow pipe handle being broken away.

Referring to the drawings more particularly and by reference characters, and particularly to the preferred embodiment of the invention as shown in Figs. 1 to 5, inclusive, 11 designates a main frame having an integral motor mounting bracket 12, which in turn has a vertical extension 13 which serves as a support for mounting the cutting or welding instrument designated generally as A. Two sharp circular shoes 14 are securely fastened against sides of main frame 11 by a bolt 15. A shaft 16 which is mounted in upper portion of main frame, preferably by means of anti-friction bearings 17, is coupled to a motor 18 by means of a flexible coupling 19 and has one or more flat lateral surfaces 20 at its forward end.

With particular reference to Figs. 1-3, it will be seen that a set screw 20a with lock nut 20b, is mounted in a metal sleeve 21, reciprocable in the frame 11, and is held in contact with the shaft 16 by means of a spring 22, which rests on the bolt 15; the holes for bolt 15 and sleeve 21 being approximately in the same plane but at right angles to each other. It will be noted that the degree of pressure between screw 20a and shaft 16 can be varied by means of turning screw 20a in or out of sleeve 21. A handle 23 is securely fastened to a stud shaft 24, which is in turn threaded at the end opposite the handle, to screw into the main frame 11. An adjustable guide arm 25 is mounted on stud 24, and on one end of bolt 15. The hole through the upper end of arm 25 provides a free or sliding fit on stud shaft 24; and the hole at the lower end of arm 25 also has freedom for movement on the bolt 15, as this lower hole in the guide arm, it may be noted, does not go all the way through the same. A compression spring 27 is disposed about the shaft 24 and between the frame 11 and arm 25 to maintain the arm 25 in an outward position against the handle 23. The object in rendering the guide arm 25 adjustable is to provide a small lateral adjustment when it is desired to use a template or guide during a cutting operation.

The lower end of the guide arm 25 has one side rounded, as shown at 25a, for contact with a template, such as 26 (see Fig. 2). It will be seen that by turning the handle 23 in either direction of rotation, arm 25 will be caused to move in or out with the handle, with reference to the frame. An ear 61, (Figs. 1 and 2) at the lower end of guide arm 25, is for the purpose of providing means for the attachment, when so desired, of a radius arm 62. The radius arm in such instances operates from a fixed center, in a conventional manner, and serves as a guide when it is desired to have the machine move in the direction of an arc on a complete circle, the center of the arc or the circle, as the case may be, being located along the rod arm 62, at an adjustable pivot which may rest on the work surface or immediately adjacent to the material to be cut or welded.

Integral with frame 11 is a boss 59 which supports a shield 60. This shield is preferably of copper and is for the purpose of protecting the shoe 14 from the heat of the cutting or welding instrument.

With particular reference to Figs. 4 and 5 it will be seen that the blow pipe or other instrument A is held in a clamp unit or substantially circular disk 28 by means of screws 29 in arm extensions 37 of the disk, said screws preferably having bearing plates 30 for contact with the instrument. The disk 28 has a slot or opening 28a of proper size to receive the blow pipe tubes. The clamp plate 28 is securely but adjustably held in a holder 31 having a yoked portion 32 adapted to be tightened by a pivotally anchored screw 33, the upper end of which is engageable in a forked extension 32a of the yoke 32.

The holder 31 has an integral plate or flange 34 adjustably secured to the bracket extension 13 by a screw 35 operating in a slot 36 of the bracket 13, the slot 36 being arc shaped and having as its approximate axis the axis of the bolt 15.

It will be noted that any cutting or welding instrument can be readily mounted to my feed control device, and the necessary and proper adjustments readily made, there being three directions of adjustments possible. The procedure of effecting such adjustments is as follows: In Fig. 1 line D—D represents the surface of material to be cut or welded. The attached blow pipe is so adjusted by means of screw 35 and clamp 28, Figs. 2 and 4, that the center line B—B of blow pipe tip 38 passes through substantially the center line of bolt 15 providing a proper clearance between end of blow pipe tip 38 and surface of material on line D—D. It will be noted that an angular adjustment of the cutting tip can be obtained by means of screw 33 and graduated scale 37a on the yoke 32. This angular adjustment is for the purpose of cutting a sloping or beveled edge.

When a cutting operation is to take place, the motor is started by switch 39, the blow pipe is held at its handle by the right hand and the left hand grasps the handle 23. The device is now placed such that shoes 14 rest on a surface integral with or immediately adjacent the material to be cut. The rotation of shaft 16 with its flat surfaces 20 at the forward end, which is in contact with screw 20a, has a cam action and produces an oscillating or vibrating effect on screw 20a, its lock nut 20b, and the block or sleeve 21. The oscillating unit formed by the combination of elements 20a—21 reciprocates at a high frequency longitudinally with respect to the screw 20a, and the reaction produced by the rapid oscillations of the reciprocating unit is such that it produces a hammering or vibrating effect between the shoes 14 and surface of material at D—D, the magnitude of which can be controlled by the adjustment screw 20a. With the adjustment as shown in Fig. 1, these vibrations are in the direction 3—3 which is at an acute angle with respect to the vertical B—B but at a wide or obtuse angle with respect to the surface D—D. By well known laws of physics these vibrations produce a component reaction along line D—D so that the speed control device with its attached blow pipe has a slow and steady forward motion. Together with this forward motion a definite and positive lateral stability is also obtained by virtue of the lateral resistance produced by the bight of the sharp shoes 14, so that there is no motion sideways. The result is that it is possible to produce a forward but well controlled motion either in a straight or curved line, and a curved path of travel is produced by merely swinging the blow pipe handle to the right or left, or else by following a template guide.

It will be noted that by means of adjusting screw 35 in slot 36 the oscillating unit can be moved to different positions so that its center line 3—3 may be angularly adjusted to positions between lines C—C and B—B (Fig. 1). The component force producing forward motion of course diminishes to zero when center line 3—3 approaches B—B, i. e., perpendicular to D—D.

It is not to be assumed that the rate of movement is entirely dependent on the reaction from the oscillating unit. The operator can with very little effort produce a steady forward motion of varying rates by applying more or less force in a forward direction with the hands. In any event the reaction from the oscillating unit eliminates any entire stoppage of motion or rapid momentary change of motion, due to the condition of surface of material or to the unsteady muscular effort on the part of the operator. For operating on material having other than horizontal surfaces, as for instance on a vertical surface, it is necessary for the operator to apply enough force with the hands to keep the shoes 14 firmly against the work. The motion on said vertical or inclined plate will then be controlled as positively as in the horizontal.

It may be noted that the shoes 14 are readily removable and shoes of other shapes and designs may be substituted, for example, shoes 40, as shown in Figs. 6, 7, and 9. These shoes have forward extensions 41, the object of which is to aid the operator in initially starting the machine at the edge of material 63 to be cut or welded. These shoes are also provided with supplemental relatively dull extensions 42 for contact with the material being worked on, as shown in Fig. 9. This adjustment makes it possible to produce lateral motion in either direction, to the right or to the left, by applying the proper guiding force with the hands. It will be noted that with this arrangement there are no sharp shoes to prevent lateral movement.

The results obtained with the motor driven unit are also obtainable with the magnetic vibrator unit, as shown in Figs. 6–8, which in the present instance is intended to be operated by an alternating current. Referring to these figures, 43 is a coil on laminated core 44. 45 designates a laminated armature hinged by pin 46 to core 44. The construction of the core and armature being clearly shown in Fig. 8. A bar 47 is fixed to the armature 45 and both are yieldingly held in operative position by means of differential spring action, due to springs 51 and 52. The said springs 51 and 52 are adjusted to a position such that an air gap 57 is obtained when the coil 43 is deenergized.

A mass element 55 is adjustably secured in a slot 58 of bar 47. 56 represents a box shaped housing for coil 43 and core 44, the core 44 being fixed to the upper face of its bottom and the base plate 48 being affixed to the lower face of its bottom. This plate 48 has the shoes 40 attached to its forward end and also carries a bolt 49 secured by nuts 54. One wall of the housing 56 has an extension 58a which serves as a supporting bracket for the yoke 31 carrying the cutting or welding instruments. By adjusting nuts 53 and 50 and adjusting mass 55 forwardly or rearwardly on the bar 47, varying intensities of vibrations can be obtained when the electric current is allowed to flow through the coil by means of switch 39. This vibration of the oscillating unit, composed of elements 45, 47, and 55, and springs 51 and 52, produces a component reaction similar to that previously described.

Another embodiment of my invention may be constructed as shown in Figs. 10 and 11, in which a conventional form of pneumatic or fluid actuated vibrator is employed. In this instance the vibrator element would primarily consist of cylinder 59 having a reciprocating piston 60, a cylinder head 61, and a regulating valve 62a controlling the flow through a supply passage 63.

In this instance the piston 60 has a port 64, communicating with the passageway 63 to admit air or liquid to the piston head to drive the piston down upon the seat 65. When the piston approaches its lowermost position, however, the port 64 is closed by the cylinder wall 66, and when it completes the downward stroke the port opens to the chamber 67, and the head pressure escapes through the port 68. The return movement of the piston is effected by fluid from the passage 63 working in an annular groove 69 in the piston to produce the necessary upward pressure. The rapidity of the piston reciprocations depends, of course, upon the fluid employed, the pressure under which it is injected, and the proportions of the various parts. In any event the reciprocations will produce the desired vibratory action to the entire unit.

It is understood that suitable modifications may be made in the general design and structural details of the invention as herein disclosed, provided, however, that such modifications come within the spirit and scope of the appended claims.

I claim:

1. A device of the character described comprising a hand guided movable frame, means for securing a cutting or welding torch to the frame, and means carried by the frame for producing vibratory pulsations to facilitate a stable advancing movement thereof.

2. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material.

3. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material, said support means being held against rotation with respect to the worked material while the device is in use.

4. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material, said support means having a sharp edge for contact with said surface to restrain transverse movement of the device with respect to the direction of travel.

5. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material, said support means including a pair of transversely spaced normally non-rotatable guiding and supporting shoes.

6. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material, said vibratory pulsations being imparted in a direction angularly disposed with respect to the said surface.

7. A device of the character described comprising a frame for carrying a torch and having a relatively fixed support means for sliding contact with a surface adjacent material to be worked upon by the torch, and means for imparting rapid vibratory pulsations in the frame to assist in facilitating progress of the frame and torch over the worked material, said vibratory pulsations being imparted in a direction angularly disposed with respect to the said surface, and means for changing the said angularity of direction of said pulsations.

8. A device of the character described comprising a movable frame for supporting and guiding a torch, a support element carried by the frame and for contact with a surface adjacent material to be operated on by the torch, a reciprocating member for producing vibrations in the device, and means for actuating said reciprocating member.

9. A device of the character described comprising a movable frame for supporting and guiding a torch, a support element carried by the frame and for contact with a surface adjacent material to be operated on by the torch, a reciprocating member for producing vibrations in the device, and means for adjusting the intensity of said vibrations.

10. A device of the character described comprising a movable frame for supporting and guiding a torch, a support element carried by the frame and for contact with a surface adjacent material to be operated on by the torch, a reciprocating member for producing vibrations in the device, in a predetermined direction of movement, and manually operative means for regulating the angularity of said vibratory direction with respect to the said supporting surface.

11. A device of the character described comprising a manually movable frame having a shoe for supporting contact with material to be operated on, and adjustable means for securing the torch to the frame whereby the torch may be tiltably adjusted and secured, longitudinally with respect to the direction of travel, and whereby the torch may be axially turned with respect to the frame to permit transverse angular adjustments to the nozzle of the torch.

12. A device of the character described comprising a manually movable frame adapted to be supported and moved on the surface of the material to be operated upon adjacent a template, means for securing a torch to the frame, a pulsator carried by the frame to create vibrations therein, and an adjustable guide carried by the frame for engagement with the template.

13. A device of the character described comprising a manually movable frame adapted to be supported and moved on the surface of the material to be operated upon adjacent a template, means for securing a torch to the frame, a pulsator carried by the frame to create vibrations therein, a handle extending from the frame for manipulating the same, and an adjustable guide member associated with the handle and for engagement with such template.

14. A device of the character described comprising a manually movable frame adapted to be supported and moved on the surface of the material to be operated upon adjacent a template, means for securing a torch to the frame, a pulsator carried by the frame to create vibrations therein, a handle extending from the frame for manipulating the same, a guide member carried by the frame, and a radius arm connected with the guide member.

15. A machine of the character described comprising a movable frame, means for securing a cutting or weld ng tool to the frame, a power driven shaft journaled in the frame, a vibratory member mounted in the frame, and means for converting rotary motion of the shaft into reciprocatory motion of the vibratory member to thereby produce pulsations in the frame.

16. A machine of the character described comprising a movable frame, means for securing a cutting or welding tool to the frame, a power driven shaft journaled in the frame, and having a portion of its length provided with a plurality of adjacent face areas, a vibratory member mounted in the frame, and means urging the member into yieldable contact with the said shaft portion.

17. A machine of the character described comprising a movable frame, means for securing a cutting or welding tool to the frame, a motor mounted on the frame, a shaft journaled in the frame to be driven by the motor, and a vibratory member operatively associated with the shaft.

18. A machine of the character described comprising a movable frame, means for securing a cutting or welding tool to the frame, a motor mounted on the frame, a vibratory member carried by the frame for operation by the motor, and adjustable means for varying the intensity of the vibrations thus created.

19. A machine of the character described comprising a movable frame, means for securing a cutting or welding tool to the frame, a vibratory piston mounted in the frame to create pulsations therein, and fluid means for actuating the piston.

20. A machine of the character described comprising a movable frame, means for securing a cutting or welding tool to the frame, a cylinder carried by the frame, a piston in the cylinder, means for introducing fluid under pressure to the cylinder, and valve means for effecting the application of such fluid pressure to the piston, alternately in opposite directions, to thereby create vibratory pulsations in the machine.

21. A machine of the character described comprising a movable frame, means for securing a cutting or welding tool to the frame, means for producing vibratory pulsations in the machine including a cylinder carried by the frame for receiving fluid under pressure, and a fluid valve control piston in the cylinder adapted to be actuated longitudinally and rapidly reciprocated by the fluid pressure, said frame having a valve controlled supply conduit communicating with the cylinder.

22. A machine of the character described comprising a movable frame, means for securing a cutting or welding tool to the frame, and a magnetically operated vibrator carried by the frame for setting up pulsations therein.

23. A machine of the character described comprising a movable frame, means for securing a cutting or welding tool to the frame, an electromagnet carried by the frame, and a vibrator unit operatively associated with the magnet and adapted when actuated to establish pulsations in the frame.

ERNEST A. HEDENSTROM.